March 6, 1951     C. LIPKIN     2,544,389

AID FOR CARRYING OUT MULTIPLICATION

Original Filed Jan. 19, 1946     3 Sheets-Sheet 1

*INVENTOR.*
CHARLES LIPKIN

BY
*ATTORNEY*

March 6, 1951     C. LIPKIN     2,544,389

AID FOR CARRYING OUT MULTIPLICATION

Original Filed Jan. 19, 1946     3 Sheets-Sheet 2

INVENTOR.
CHARLES LIPKIN
BY
ATTORNEY

March 6, 1951  C. LIPKIN  2,544,389
AID FOR CARRYING OUT MULTIPLICATION
Original Filed Jan. 19, 1946  3 Sheets-Sheet 3
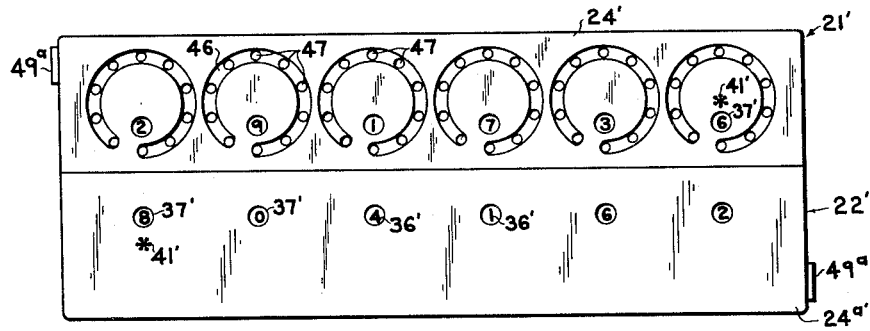
Fig. 17.
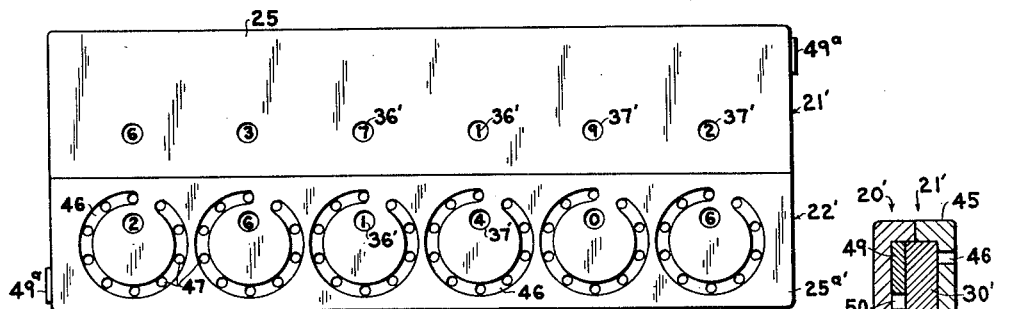
Fig. 18.
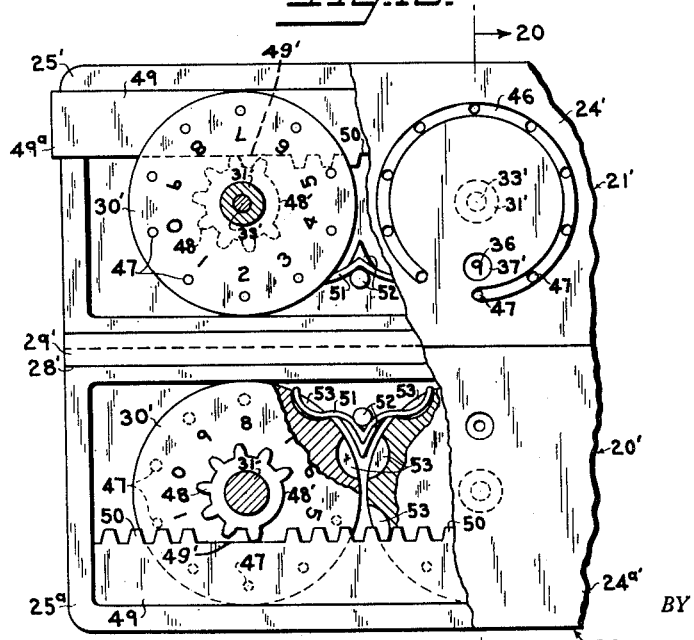
Fig. 19.
Fig. 20.
INVENTOR.
CHARLES LIPKIN
BY
ATTORNEY Patented Mar. 6, 1951

2,544,389

UNITED STATES PATENT OFFICE 2,544,389

AID FOR CARRYING OUT MULTIPLICATION

Charles Lipkin, New York, N. Y.

Substituted for abandoned application Serial No. 642,199, January 19, 1946. This application December 3, 1948, Serial No. 63,335

2 Claims. (Cl. 235—74)

The present invention relates to new and useful improvements in a device for assisting in multiplication of two numbers and this application is a substitute for my abandoned application Serial No. 642,199 filed January 19, 1946.

More particularly, the present invention relates to an aid for carrying out multiplication of simple and novel construction and operation using the principle of slide multiplication whereby any number or figure may be quickly multiplied by any other number or figure and the product quickly and accurately obtained.

The invention proposes a device embodying two sections slidably joined and held together along two abutting longitudinal edges and each provided with a plurality of wheels rotatably mounted in aligned relation and each wheel bearing numerals from 1 through 9 and 0 (zero) equidistantly spaced apart in circles. The circles should be preferably of corresponding size on both or opposite sides of the wheels so that the numerals may be simultaneously exposed and visible at windows or openings through both or opposite sides of the sections, but should be reversed or transposed in order, in combinations. Each wheel has a peripheral tooth for each numeral or digit so that the rotation of each wheel, one tooth at a time will advance the numerals one at a time. In conjunction with the slidable mounting of the sections one on the other, the wheels may be so related to each other as to greatly facilitate multiplication of two sets of numbers or one by another so that the product may be quickly ascertained and read.

The invention also proposes and embraces novel means to hold each adjacent pair of wheels in a set position with a minimum number of spring catches bearing in the recesses between adjacent teeth of each wheel. The teeth of the wheels project centrally into recesses along the remote or opposite edges of the sections to protect the wheels against accidental movement or upsetting when the wheels are set to expose the numerals thereof through the windows or openings. There is one opening for each wheel at each side of the device or two openings in alignment at opposite sides of each section to line up with the same numerals duplicated on opposite sides of the wheels.

The invention also proposes novel means for aligning the numerals or digits of each wheel of one slidable section with the numerals of any wheel of the other slidable section when the sections are slid one relative to the other. One section engaging notches in the other section, in spaced relation and alignment with each opposed set of windows or openings and the centers and also the exposed peripheral teeth of the respective wheels determine by sound and feel when the catches engage in the notches together with markings or lines vertically connecting each superimposed set of windows one above the other to indicate visually their vertical alignment.

The invention also proposes novel construction of the sections to rotatably mount the toothed wheels and catches; to slidably connect the sections for sliding movement on each other to place the various numerals in a desired relation; to step the sections one along the other in progressive or other relation with respect to the numerals of the various and adjacent wheels. This novel operation of multiplying proceeds in a simple, quick and efficient manner whereby various and large numbers or figures may be multiplied by one another within a minimum of time and accurate results or products obtained with a considerable saving of time and labor.

The invention also proposes a multiplying device of the slide rule type except that only two sections are employed. These two sections have two edges slidably connected instead of employing a medial, runner or slip-stick slidable in a groove in the center of an outer rule which surrounds the runner at the back, top and bottom. The numerals or combinations of numbers can be large enough to be easily read without depending upon the slides coming to rest at minute graduations of an engine-ruled scale which is subject to error from warping, distortion or inaccurate reading as those familiar with such devices will readily appreciate. Because of the present construction and arrangement, accurate readings can be made even before the slides come to rest at any setting. The arrangement permits mental computation of the product or products of each set of two numbers, which happen to approximate vertical juxtaposition, without even bringing the slides to rest, something practically impossible in the use of an ordinary slide rule, and with an action which may be said to be almost continuous in its operation or without requiring an appreciable or noticeable pause in its action in use.

This invention also proposes a variation of the number of wheels and openings in the sections which are slidably connmected along adjacent longitudinal edges so as not to be accidentally displaced or disconnected transversely when separated or pulled away from each other. These wheels and openings are so related that the equidistantly spaced windows and numerals visible therethrough may be stepped along or advanced in any order of alignment and the sections may be extended in either direction the full lengths of the longitudinal rows of numerals on the wheels. The holes through which they are visible permit brief instructions for the operation and use of the device to be marked on the opposite faces of the sections to facilitate such use and computings in multiplying by turning the device from left to right or vice versa lengthwise thereas distinguished from tumbling, rolling or turning over from top to bottom or vice versa.

The invention also embraces making the instrument in different ways and of different materials, including the mounting of the wheels, the slidable connection between contiguous edges of the sections with or without the wheels and windows with the numerals thereon, or with the numerals of the numbers to be multiplied together to be written on the slides in proper order and relation and later erased for repeated use of the spaces therefor, care being taken to reverse one of the multipliers, either the multiplicand or multiplier, in order to proceed with the multiplication. It is also preferable to have vertical lines connecting each set of windows and numerals appearing therethrough as they come into vertical position one over the other. Unlike ordinary slide rules, these lines do not have to be exactly in position or accurately aligned as long as they are closely adjacent. The slides or sections need not come to a full stop in order for the user to see which numerals are to be used next in the multiplication and therefore slight warping or misalignment does not interfere with or make any difference in the accurate readings and use of the instrument as would occur in the case of an ordinary slide rule. No cursor, finder or magnifying glass is needed to show which numerals are to be read in connection with their opposing numerals vertically as with a slide rule where the markings or graduations and numerals are extremely minute and close together as with an engine-ruled scale. With the present device, the numerals are sufficiently large and widely spaced apart as to be readily discernible, thereby facilitating computations as compared to the use of a slide rule.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 17 is a view similar to Fig. 3, but illustrating the device constructed in accordance with a modification of the present invention.

Fig. 18 is a rear elevational view of Fig. 17.

Fig. 19 is an enlarged detailed view of a portion of Fig. 17 with parts thereof broken away to reveal interior construction.

Fig. 20 is a transverse cross sectional view taken on the line 20—20 of Fig. 19.

Generally and broadly, the device or instrument of the present invention embodies two sections or slides, slidably connected or associated along contiguous or abutting longitudinal edges so as to slide one relative to the other lengthwise in either direction so that either section may be slid to project at either end with respect to the other section. The sections are held from displacement edgewise or transversely, that is pulling apart in the plane thereof. Each section is provided with wheels bearing numerals at equidistantly spaced points from 1 to 9 and 0 (zero) on one and/or both sides and means for aligning the same simultaneously when the sections are together, or some of them in different positions, when the sections are slid or extended relative to each other. One section can be projected at one end and the other section at the other end and can be stepped along at uniform spaced intervals to align different numerals in units, tens, hundreds, thousands, etc., columns for alternately multiplying and sliding to facilitate multiplication of various odd or large numbers quickly and accurately. The numerals may be preferably arranged to be viewed on both sides and to expose the same numerals on opposite sides in the same individual positions, but reversed on opposite sides, so that a series of numerals comprising a number are arranged in reverse order as they appear at the inside instead of in the order in which they would appear if written in multiplying so that the operation may be carried on by the device, placing the digits in the proper columns, according to their value and order of use as a multiplier.

Both or either the multiplicand or the multiplier may be used as a multiplier, and the numerals may appear equidistantly spaced permanently printed, etched or embossed on wheels in circles concentric to a common center of rotation, provided with means such as a knob, pins or teeth positioned on the periphery or radially in line with the numerals to advance the same successively and progressively from 1 to 9 and 0 (zero). The numerals are held in set position according to the numbers or figures to be multiplied one by the other. Means are also provided to hold the sections in set positions throughout their lengths or distance of movement with some or all of the numerals in alignment as described. Means is also provided to hold each wheel in set position.

Figure 4:
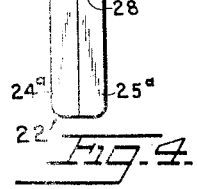
Fig. 4 is an enlarged end elevational view looking from right side of Fig. 3.
Figure 7:
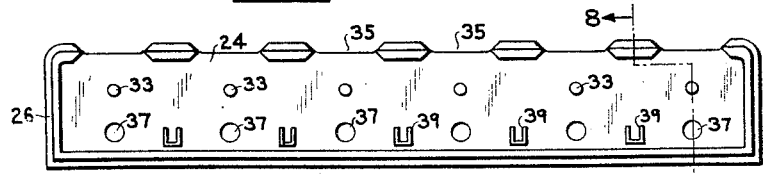
Fig. 7 is an inside elevational view of the front plate of the upper section of the device.
Figure 8:
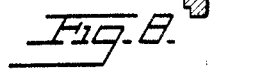
Fig. 8 is a sectional view taken on the line 8—8 of Fig. 7.
Figure 9:
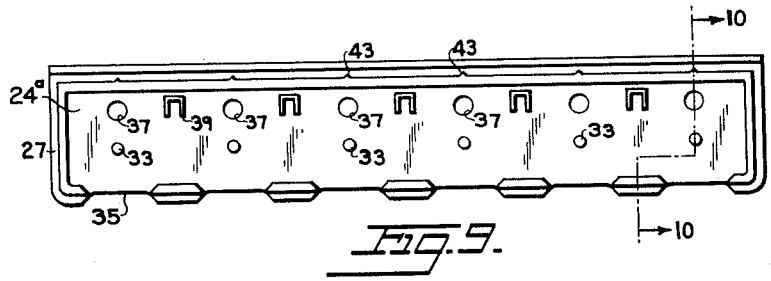
Fig. 9 is a view similar to Fig. 5 of the front plate of the bottom section of the slide.
Figure 10:
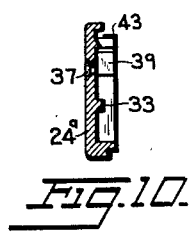
Fig. 10 is a sectional view taken on the line 10—10 of Fig. 9.
Figure 11:
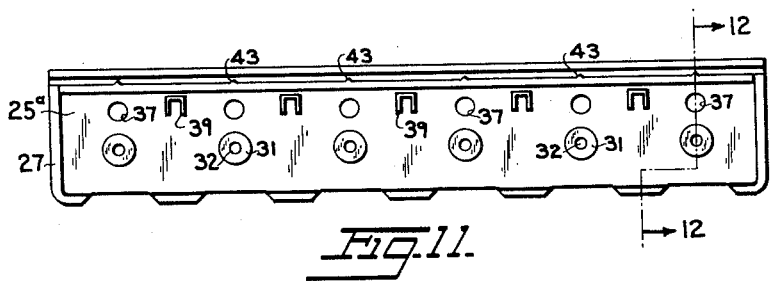
Fig. 11 is an inside elevational view of the rear plate of the bottom section of the slide.
Figure 12:
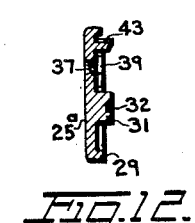
Fig. 12 is a sectional view taken on the line 12—12 of Fig. 11.
Figure 5:
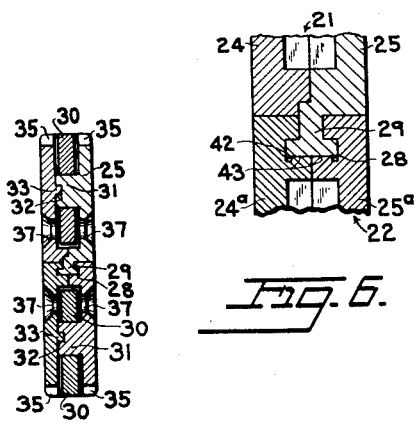
Fig. 5 is an enlarged transverse cross-sectional view taken on the line 5—5 of Fig. 3.
Figure 6:
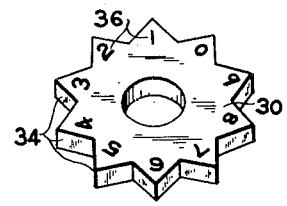
Fig. 6 is an enlarged detailed view of a portion of Fig. 5.

As shown in Figs. 1 to 16 inclusive, the multiplying device 20 comprises an upper section 21 and a lower section 22. The sections 21 and 22 are alike and are slidably connected together along contiguous longitudinal edges as at 23, so as to slide one on the other lengthwise. The upper section 21 comprises plates 24 and 25, and the lower section 22 comprises plates 24ᵃ and 25ᵃ of suitable material, preferably rigid, such as metal, plastic, etc., joined together in any suitable fashion, such as cementing along edge flanges 26 and 27 and interfitting with each other to provide spaces between the plates bounded by the flanges. The sliding connection 23 comprises a groove 28 in the lower section 22 and a rib 29 on the upper section 21, see Figs. 4 to 6, which have a locking interfit and may be dove-tailed to permit the sections 21 and 22 to slide endwise one into the other, at such connection, at either end, and to be similarly disconnected while retained against transverse or lateral displacement. In each hollow, center space of the sections 21 and 22 there are wheels 30 rotatably mounted on circular shafts 31 integrally formed on the rear plates 25 and 25ᵃ of the sections 21 and 22. Recesses 32 are formed in the free ends of the shafts 31 and receive projections 33 integrally on the inner faces of the front plates 24 and 24ᵃ. The wheels 30 each have ten teeth 34 equidistantly spaced apart to extend openings 35 equidistantly formed in the top and bottom edges of the sections 21 and 22 to permit stepped rotation of the wheels and to protect the wheels against being accidentally turned.

Figure 3:
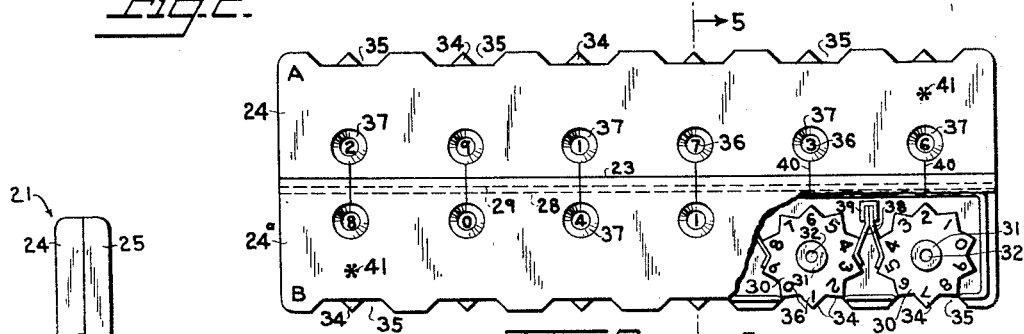
Fig. 3 is an elevational view similar to Fig. 1, showing a different position of the parts and with one end of the instrument partly broken away.
Figure 15:
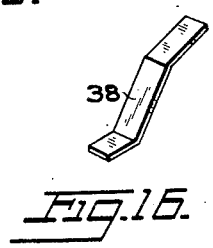
Fig. 15 is a perspective view of one of the wheels, per se.
Figure 16:
Fig. 16 is a perspective view of one of the latch springs, per se.

Each wheel 30 also bears numerals 36 from 1 to 9 and 0 (zero), see Figs. 3 and 15, on opposite sides radially aligned with the teeth to be advanced or stepped along therewith progressively. The numerals 36 are positioned to appear simultaneously through aligned windows 37 formed in the plates of both sections 21 and 22. The numerals on opposite faces of the wheels 30 are transposed or reversed so that the same numeral will appear in the aligned windows 37 of sections in any given rotative positions of the wheels 30.

Means are provided for holding the wheels 30 in desired adjusted rotative positions in which the desired numerals 36 will be aligned with the windows 37. The means comprises leaf springs 38 preferably constructed of spring steel or other similar flexible material. The springs 38, between each pair of wheels 30 have their ends secured in suitable aligned lugs 39 formed on the inside faces of the plates of each of the sections. The springs 38 have their ends securely attached to one of their supporting lugs 39 by means of glue or any other suitable securing means, to retain the springs 38 in position. The free ends of the springs 38 are bent into somewhat flattened V-shapes to seat in the notches between adjacent teeth 34 of the wheels, as shown in Fig. 3, to retain the wheels 30 against accidental rotation. When the wheels 30 are manually turned in one direction or the other, the free ends of the springs 38 will merely snap from one notch to the next.

In using the device of the present invention, the sections 21 and 22 are to be slid longitudinally relative to one another to vertically align the windows 37 to permit the numerals in vertically aligned windows to be multiplied mentally, as will become clear as this specification proceeds. The opposed faces of the sections 21 and 22 on opposite sides of the meeting edges 23 of the sections are formed with short vertical lines 40 which extend from the windows 37 to the meeting edges 23, see Figs. 1 to 3. When the windows 37 are in vertical alignment, the lines 40 will be in end alignment as shown in Fig. 3.

The faces of the sections 21 and 22 are also provided with small asterisks 41 adjacent opposed windows 37. These asterisks 41 are provided to be vertically aligned at the start of each multiplying operation to designate the proper starting position of the device. The asterisks 41 are etched, printed, embossed or in any other manner formed on the opposed faces of the sections 21 and 22.

Figure 13:
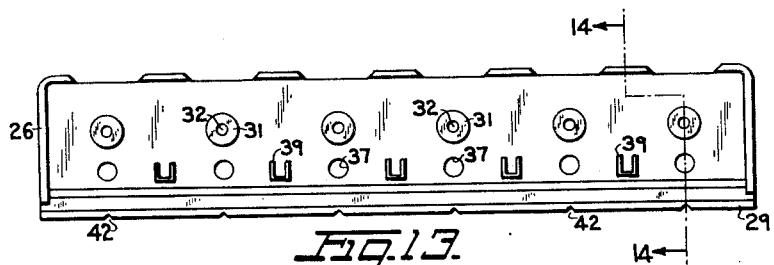
Fig. 13 is a view similar to Fig. 11 of the rear plate of the top section of the slide.
Figure 14:
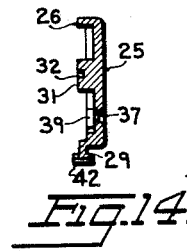
Fig. 14 is a section taken on the line 14—14 of Fig. 13.

To retain the sections 21 and 22 against accidental longitudinal movement during the course of solving a multiplication problem on the device, the bottom face of the rib 29 is formed with a plurality of equally spaced recesses 42. As shown in Fig. 13, there is a recess 42 beneath each of the windows 37. The base wall of the groove 28 is formed with a plurality of upstanding projections 43, one for each of the recesses 42. The projections 43 extend into the recesses 42 and retain the sections 21 and 22 against longitudinal movement unless the sections are manually forced in one direction or the other to cause the projections to snap out of the recesses 42 with which they were engaged and to snap into the recesses in the newly aligned position of the sections 21 and 22. As is apparent from Figs. 6, 9 and 11, the projections 43 are partially formed on each of the plates 24ᵃ and 25ᵃ forming the lower section 22 of the device.

The operation of the device is as follows:

To start a multiplication problem, the sections 21 and 22 are first slid longitudinally to the position shown in Fig. 3, and all of the wheels 30 are turned to the positions in which the "zero" digits will be visible in the aligned window openings 37.

Figure 1:
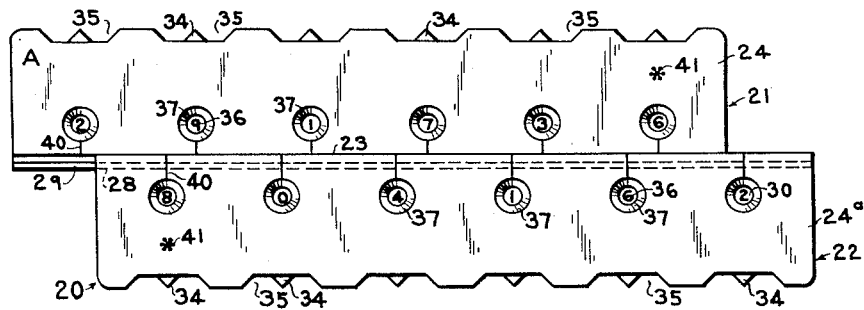
Fig. 1 is a front elevational view of the multiplying device or instrument constructed in accordance with the present invention.
Figure 2:
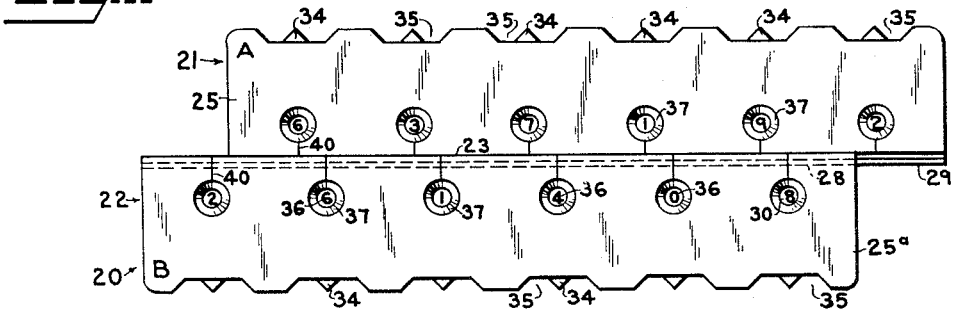
Fig. 2 is a rear elevational view of Fig. 1.

Let us assume, for the sake of illustration, that it is desired to multiply 291,736 by 261,408. The wheels 30 of the top section 21 are then turned to show the digits of the multiplicand, 291,736, in the windows 37 of the top section, as shown in Fig. 3. The digits of the multiplier, 261,408, are then set up in the windows 37 of the lower section 22; however, it will be necessary to set up the digits of the multiplier in the reverse order. This is done by turning the device over, as shown in Fig. 2, and then aligning the digits of the multiplier with the windows 37 on the back of the lower section 22 in proper order. On the back side, the digits of the multiplicand, aligned with the windows 37 of the top section 21, appear in reverse order as shown in Fig. 2. After all the digits of the multiplier have been set up in the windows 37 of the bottom section 22, the device is again turned over to expose the front face. On the front face, the digits of the multiplicand, 291,736, will appear in proper order in the windows 37 of the top section 21 and the digits of the multiplier, 261,408, will appear in reverse order in the windows 37 of the lower section 22. The sections 21 and 22 are then slid longitudinally relative to each other in a direction to vertically align the asterisks 41 bringing the opposed endmost digits "6" and "8" into vertical alignment. The digits of the top and bottom sections will then appear this way:

| 2 | 9 | 1 | 7 | 3 | 6* |   |   |   |   |
|---|---|---|---|---|---|---|---|---|---|
|   |   |   |   |   | 8* | 0 | 4 | 1 | 6 | 2 |

The multiplication is then carried by mentally multiplying together the superimposed digits. 8×6=48 and then putting down the "8" on a sheet of paper and carrying the "4."

The sections 21 and 22 are then slid to vertically align the two digits at the adjacent ends of the numbers, so that the digits of the top and bottom sections appear this way:

| 2 | 9 | 1 | 7 | 3 | 6* |
|---|---|---|---|---|---|
| | *8 | 0 | 4 | 1 | 6 | 2 |

Then the vertically aligned digits are multiplied together and their products are added together and the sum of those two numbers is added to the "4" carried over from the previous multiplication; 8×3=24  6×0=0  24 plus 0 plus 4 equals 28. The "8" is then put down on the sheet of paper to the left of the eight of the previous multiplication; thusly, 88, and carry the "2."

Completion of the multiplication is then carried out by again sliding the sections 21 and 22 to vertically align the three digits at the adjacent ends of the numbers, so that they appear this way:

| 2 | 9 | 1 | 7 | 3 | *6 |
|---|---|---|---|---|---|
| | | *8 | 0 | 4 | 1 | 6 | 2 |

Then multiply the vertically aligned digits and add the products; 56 plus 0 plus 24 plus the 2 carried from the previous multiplication equals 82. Put down the "2" (288) and carry the "8."

Again slide the sections 21 and 22 to vertically align the four digits at the adjacent ends of the numbers, so that they appear this way:

| 2 | 9 | 1 | 7 | 3 | 6* |
|---|---|---|---|---|---|
| | | | *8 | 0 | 4 | 1 | 6 | 2 |

Then multiply the vertically aligned digits and add their products; 8 plus 0 plus 12 plus 6 plus the 8 carried from the previous multiplication equals 34. Put down the "4" (4288) and carry the "3."

The sections 21 and 22 are again slid longitudinally to vertically align the five digits at the adjacent ends of the numbers, so that they appear this way:

| 2 | 9 | 1 | 7 | 3 | 6* |
|---|---|---|---|---|---|
| *8 | 0 | 4 | 1 | 6 | 2 |

The vertically aligned digits are multiplied and the products are added; 72 plus 0 plus 28 plus 3 plus 36 plus the 3 carried from the previous multiplication equals 142. Put down the "2" (24288) and carry the "14."

The sections 21 and 22 are again slid to vertically align the six digits of the two numbers, so that they appear this way:

| 2 | 9 | 1 | 7 | 3 | 6* |
|---|---|---|---|---|---|
| *8 | 0 | 4 | 1 | 6 | 2 |

Multiplication is again carried out and the products are added; 16 plus 0 plus 4 plus 7 plus 18 plus 12 plus the 14 carried from the previous multiplication equals 71. Put down the "1" (124288) and carry the "7."

Movement of the sections 21 and 22 is continued in the same longitudinal direction to project the digits "6" and "8" one space from the opposite ends of the lines of digits, so that they appear this way:

| | 2 | 9 | 1 | 7 | 3 | 6* |
|---|---|---|---|---|---|---|
| *8 | 0 | 4 | 1 | 6 | 2 | |

Multiplication and addition are again carried out; 0 plus 36 plus 1 plus 42 plus 6 plus the 7 carried from the previous multiplication equals 92. Put down the "2" (2124288) and carry the "9."

Again slide the sections 21 and 22 to vertically align the four digits at the adjacent ends of the numbers, so that they appear this way:

| | | 2 | 9 | 1 | 7 | 3 | 6* |
|---|---|---|---|---|---|---|---|
| *8 | 0 | 4 | 1 | 6 | 2 | | |

Multiply the four vertically aligned sets of digits and add their products; 8 plus 9 plus 6 plus 14 plus the 9 carried from the previous multiplication equals 46. Put down the "6" (62124288) and carry the "4."

The sections are then slid longitudinally to vertically align the three digits at the adjacent ends of the numbers, so that they appear this way:

| | | | 2 | 9 | 1 | 7 | 3 | 6* |
|---|---|---|---|---|---|---|---|---|
| *8 | 0 | 4 | 1 | 6 | 2 | | | |

Multiply the three vertically aligned sets of digits and add their products: 2 plus 54 plus 2 plus the 4 carried from the previous multiplication equals 62. Put down the "2" (262124288) and carry the "6."

The sections are then slid longitudinally to vertically align the two digits at the adjacent ends of the numbers, so that they appear this way:

| | | | | 2 | 9 | 1 | 7 | 3 | 6* |
|---|---|---|---|---|---|---|---|---|---|
| *8 | 0 | 4 | 1 | 6 | 2 | | | | |

Multiply the two vertically aligned sets of digits and add their products; 12 plus 18 plus the 6 carried from the previous multiplication equals 36. Put down the "6" (6262124288) and carry the "3."

Finally, slide the sections 21 and 22 to vertically align the last two digits at the adjacent ends of the numbers, so that they appear this way:

| | | | | | 2 | 9 | 1 | 7 | 3 | 6* |
|---|---|---|---|---|---|---|---|---|---|---|
| *8 | 0 | 4 | 1 | 6 | 2 | | | | | |

Multiply the two vertically aligned digits; 4 plus the 3 carried from the previous multiplication equals 7. Put down the "7" (76262124288). Thus, the product of multiplying 291,736 by 261,408 is 76,262,124,288.

It is apparent from the foregoing that a simple device has been provided to facilitate the multiplication of any two numbers having not more than six digits in each number being multiplied. It is possible to multiply numbers having more than six digits in one or both numbers, but then the device will have to have more than six wheels 30 in each of the sections. The multiplication can also be carried out by using the back side of the device, but then the digits of the multiplicand, 291,736, will appear in reverse order and the digits of the multiplier, 261,408, will appear in proper order.

In the modification of the invention shown in Figs. 17 to 20, inclusive, the structure is somewhat similar to that previously described. The top and bottom edges of the sections 21' and 22'' are closed and smooth as indicated at 45 and the edges of the wheels 30' are smooth. However, the front plate 24' of the upper section 21' and the rear plate 25ª' of the lower section 22' are provided with circular slots 46 of nearly 360 degrees and the wheels 30' are provided with equidistantly spaced holes 47 aligned radially with the numerals 36' and aligned with the slots 46 so that a pointed object may be passed through one of the slots 46 and into one of the aligned holes 47 for turning the wheels 30'. This manipulation exposes the desired numerals 36' through the windows 37' to expose the required digits of the numbers to be multiplied together in the same manner as before described.

A resetting device is provided for the wheels 30', to set them all simultaneously back to 0 (zero). This resetting device consists of a pinion 48 fixed on each wheel 30', a shown in Figs. 18 and 19, and a rack 49 slidable between the plates of each of the sections and having spaced sets of teeth 50 to engage the pinions 49 and turn the wheels 30' back to their starting position.

Normally, the spaces between the sets of teeth 50 of the racks 49 are aligned with the pinions 48, so that the wheels 30' are free to be manually rotated independently of each other to align the desired numeral 36' with the respective window openings 37'. Also, the pinions 48 are formed on one side, in radial alignment with the numeral "5," with a toothless area 48', see Fig. 19. The racks 45 have similar toothless areas 49' which cooperate with the toothless areas 48' of the gears in the fully in positions of the racks, to free the wheels 30' from the racks 49 when the wheels have been turned back to their positions in which the numerals "0" are aligned with the window openings. Opposite ends 49ª of the racks 49 extend from opposite ends of the device to be pulled outward for turning the wheels 30' back to their position in which the zeros will be aligned with the window opening 37'. Upon being pulled out the spaced teeth 50 of the respective racks 49 immediately mesh with the pinions 48 and turn the same until the zeros are aligned with the window openings 37' and the toothless areas 48' of the pinions 48 become aligned with the spaced teeth 50 of the racks 49. Rotation of the wheels 30' then stops and after the racks 49 have been completely pulled out they are immediately returned to their starting position with no effect on the position of the wheels 30' as the toothless areas 48' of the pinions 48 will now be facing the spaced teeth 50 of the racks 49. The return movements of the racks 49 again align the toothless areas 49' of the racks with the toothless areas 48' of the pinions 48 leaving the wheels 30' free to be manually rotated independently of the racks 49.

When free of the spaced teeth 50 of the racks 49, the wheels 30' are held against rotation by means of leaf springs 51 which have their intermediate portions secured in position between spaced lugs 52 formed on the plates of the sections 21' and 22'. The ends of the springs 51 are bent to engage complementary notches 53, see the bottom portion of Fig. 19, formed in the periphery of the wheels 30'. When the wheels 30' are turned, the ends of the springs 51 merely nap into and out of the notches 53. The notches 53 are formed in the periphery of the wheels 30' in radial alignment with the numerals 36'.

In other respects this form of the invention is similar to the previous form, and like parts are identified by the same reference numeral with a prime added.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. In an instrument of the class described having a pair of like adjacent hollow sections formed with aligned window openings and enclosing rotatively mounted discs carrying numbers to be multiplied which can be selectively exposed in the window openings, a rib formed on the edge of one of the sections facing the other section, the other section having a groove formed in its adjacent edge portion into which said rib is slidably engaged, said groove opening to the ends of its respective section leaving the sections free to be slid relative to each other with their ends projected beyond each other in either direction to align the numbers, and means releasably retaining the sections against sliding movements with desired numbers aligned.

2. In an instrument of the class described having a pair of like adjacent hollow sections formed with aligned window openings and enclosing rotatively mounted discs carrying numbers to be multiplied which can be selectively exposed in the window openings, a rib formed on the edge of one of the sections facing the other section, the other section having a groove formed in its adjacent edge portion into which said rib is slidably engaged, said groove opening to the ends of its respective section leaving the sections free to be slid relative to each other with their ends projected beyond each other in either direction to align the numbers, and means releasably retaining the sections against sliding movements with desired numbers aligned, said retaining means comprising upstanding projections formed on the section formed with said groove, said projections being located within said groove one in lateral alignment with each of the windows, and corresponding grooves formed on said rib and engaged by said ribs.

CHARLES LIPKIN.

REFERENCES CITED

The following references are of record in the file of this patent:

UNITED STATES PATENTS

| Number | Name | Date |
|---|---|---|
| 460,930 | Cox | Oct. 6, 1891 |
| 508,435 | Miller | Nov. 14, 1893 |
| 779,088 | Locke | Jan. 3, 1905 |
| 1,165,058 | Behan | Dec. 21, 1915 |
| 1,764,915 | Vethe | June 17, 1930 |
| 1,961,053 | Kubler | May 29, 1934 |
| 2,380,846 | Josepho | July 31, 1945 |

FOREIGN PATENTS

| Number | Country | Date |
|---|---|---|
| 7,819 | Great Britain | 1902 |
| 101,705 | Great Britain | Sept. 24, 1917 |